J. S. HARMON.
FILM SPOOL.
APPLICATION FILED AUG. 27, 1917.

1,270,614.

Patented June 25, 1918.

Witnesses
Nelson H. Copp
[signature]

INVENTOR.
John S. Harmon
BY [signature]
his ATTORNEYS.

UNITED STATES PATENT OFFICE.

JOHN S. HARMON, OF ROCHESTER, NEW YORK, ASSIGNOR TO EASTMAN KODAK COMPANY, OF ROCHESTER, NEW YORK, A CORPORATION OF NEW YORK.

FILM-SPOOL.

1,270,614.  Specification of Letters Patent.  Patented June 25, 1918.

Application filed August 27, 1917. Serial No. 188,319.

*To all whom it may concern:*

Be it known that I, JOHN S. HARMON, of Rochester, in the county of Monroe and State of New York, have invented certain new and useful Improvements in Film-Spools; and I do hereby declare the following to be a full, clear, and exact description of the same, reference being had to the accompanying drawings, forming a part of this specification, and to the reference-numerals marked thereon.

My present invention relates to photography and more particularly to photographic film spools as used in the well known film cartridge and the invention has for its object to provide a film spool constructed entirely of sheet metal that will be simple, light and strong and which can be produced at a low cost. A further object of the invention is to provide a spool of this character in the construction of which relatively thin metal can be employed to produce an article that will nevertheless be rigid and durable. To these and other ends the invention resides in certain improvements and combinations of parts all as will be hereinafter more fully described, the novel features being pointed out in the claims at the end of the specification.

In the drawings.

Similar reference numerals throughout the several views indicate the same parts.

Figure 1:
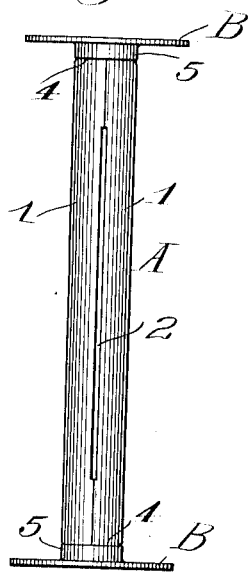
Figure 1 is a side view of a film spool constructed in accordance with and illustrating one embodiment of my invention.

Referring to Fig. 1, the spool has the general characteristics of any film spool, namely, it consists of a core piece or center A of substantial diameter and end flanges B. The core A is composed of two semi-cylindrical sheet metal shells 1, the blanks for which are so shaped that a slot 2 is formed along the seam at their meeting edges on one side for attaching the end or leader of the film strip. The ends of the shells are offset inwardly at 3 to provide reduced portions at the ends of the core piece terminating in annular shoulders 4. Over these reduced portions are closely fitted and suitably secured collars 5 on the end flanges B that are otherwise in the form of flat annular disks. The peripheries of these collars 5, by reason of the offsets 3, lie flush or continuous with the cylindrical surface of the tubular core to provide an even winding surface for the first convolution of film extending squarely up to the inside faces of the end flanges, while the end face of the core A lies flush with the outer or end face of the flange in each instance.

Figure 2:
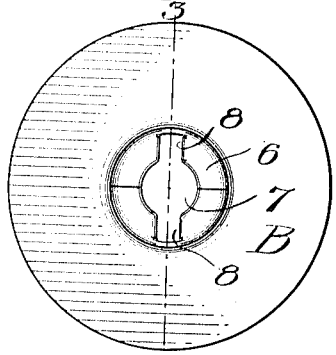
Fig. 2 is an enlarged end view thereof.
Figure 6:
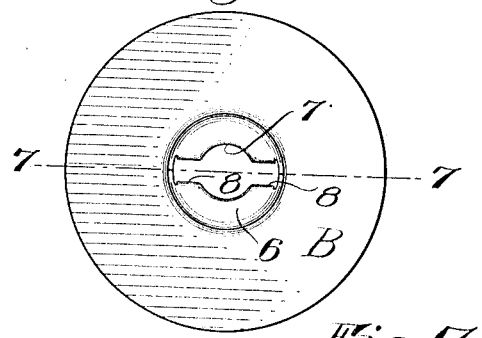
Fig. 6 is an enlarged end view of a modified construction.
Figure 3:
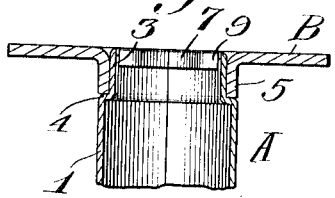
Fig. 3 is a fragmentary section taken on the line 3—3 of Fig. 2.
Figure 7:
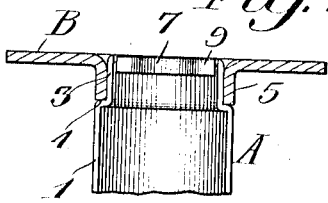
Fig. 7 is a section taken substantially on the line 7—7 of Fig. 6.
Figure 4:
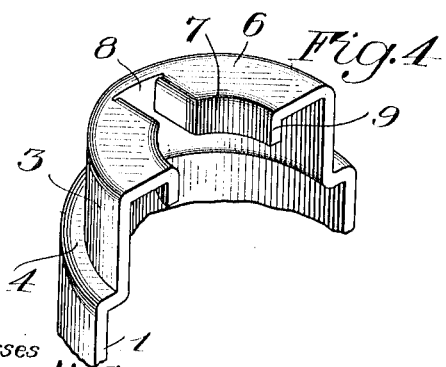
Fig. 4 is an enlarged perspective fragmentary view of one end of one of the shells constituting the center or core.
Figure 5:
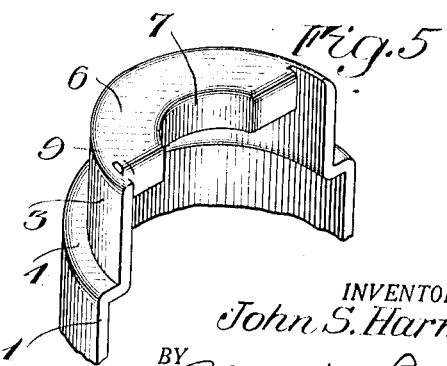
Fig. 5 is a similar view of the other end of said shell.

The said end face of the core is, in each instance, composed of an inwardly turned extension 6 of the material at the extremity of each of the two shells and the said extensions so constituting the core end are formed to jointly provide a preferably circular aperture or opening 7 at each end of the spool for the reception of the journals or axial supports of the spool. In one case, the opening 7 is continuously circular to receive the ordinary spool center while in the other case, communicating slots or irregularities 8 are provided to furnish interlocking contact points for the usual form of winding key. These slots 8 preferably extend at right angles or transversely to the plane of the seam between the shells 1, as shown in Fig. 2, so as not to exert a strain in winding tending to separate the shells, but in Fig. 6 I have shown them extending coincidently with the seam.

As a further provision against distortion of the sheet material in the region of the opening 7, I prefer to again flange the extremity 6 of the material of the core piece downwardly at 9 which gives the wall of the opening a more extended bearing surface and strengthens the formation in other ways.

The spool of my invention is easily assembled and can be made of very light sheet metal to give adequate rigidity.

I claim as my invention:

1. In a sheet metal film spool, the combination with a pair of semi-cylindrical shells assembled to form a tubular center or core and provided at their extremities with inwardly turned flanges jointly forming a slot at one end of the spool for the reception of a winding key, the slot extending transversely of the seam between the shells, of flanges secured to the ends of the core and operating to hold the shells together.

2. In a sheet metal film spool, the combination with a pair of semi-cylindrical shells assembled to form a tubular center or core and provided at their extremities with inwardly turned flanges jointly forming openings at the ends of the spool for the reception of axial supports or journals, said flanges being again turned inwardly longitudinally of the core to provide extended bearing surfaces at the sides of the openings, of flanges secured to the ends of the core and operating to hold the shells together.

JOHN S. HARMON.

Witnesses:
JOHN E. SHEARER,
C. E. MARTIN.